US008717495B2

(12) United States Patent
Tobinaga et al.

(10) Patent No.: US 8,717,495 B2
(45) Date of Patent: May 6, 2014

(54) DIGITAL CAMERA

(75) Inventors: Masato Tobinaga, Hyogo (JP); Hirotsugu Fusayasu, Kyoto (JP); Masafumi Kumoi, Osaka (JP); Shinkuro Fujino, Kyoto (JP)

(73) Assignee: Panasonic Corporation, Osaka (JP)

( * ) Notice: Subject to any disclaimer, the term of this patent is extended or adjusted under 35 U.S.C. 154(b) by 8 days.

(21) Appl. No.: 13/520,049

(22) PCT Filed: Apr. 15, 2011

(86) PCT No.: PCT/JP2011/002221
§ 371 (c)(1),
(2), (4) Date: Jun. 29, 2012

(87) PCT Pub. No.: WO2011/129118
PCT Pub. Date: Oct. 20, 2011

(65) Prior Publication Data
US 2012/0293701 A1    Nov. 22, 2012

(30) Foreign Application Priority Data
Apr. 16, 2010    (JP) .................................. 2010-094689

(51) Int. Cl.
*H04N 5/225*    (2006.01)
(52) U.S. Cl.
USPC .......................................... 348/373; 348/374
(58) Field of Classification Search
USPC .................................................. 348/373, 374
See application file for complete search history.

(56) References Cited

U.S. PATENT DOCUMENTS

| 6,900,843 | B1 | 5/2005 | Uchiyama | |
|---|---|---|---|---|
| 7,362,371 | B1 * | 4/2008 | Tanaka et al. | 348/373 |
| 2003/0133706 | A1 * | 7/2003 | Kume et al. | 396/281 |

FOREIGN PATENT DOCUMENTS

| JP | 2001-051329 | 2/2001 |
|---|---|---|
| JP | 2001-135969 | 5/2001 |
| JP | 2005-197882 | 7/2005 |
| JP | 2009-260600 | 11/2009 |
| JP | 2010-026158 | 2/2010 |

OTHER PUBLICATIONS

International Search Report issued in International Patent Application No. PCT/JP2011/002221 dated May 17, 2011.

* cited by examiner

*Primary Examiner* — Joel Fosselman
(74) *Attorney, Agent, or Firm* — McDermott Will & Emery LLP

(57) ABSTRACT

Provided is a digital camera including: a camera body (1) that includes a body mount to which a lens unit, which forms an optical image of a subject, can be attached; an image sensor (8) that is disposed in a body chassis (3) of the camera body (1) to convert the optical image of the subject into image data; a main circuit board (11) to which an image sensor (8) is electrically connected; and an electronic viewfinder (6) that includes a monitor on which a through image captured by the image sensor (8) is displayed, wherein a conductive shielding member (33) is disposed in the body chassis (3) in order to electromagnetically shield a region between a space in which the image sensor (8) and the main circuit board (11) are disposed from a space in which the electronic viewfinder (6) is disposed.

4 Claims, 6 Drawing Sheets

DIGITAL CAMERA

RELATED APPLICATIONS

This application is the U.S National Phase under 35 U.S.C. §371 of International Application No. PCT/JP2011/002221, filed on Apr. 15, 2011, which in turn claims the benefit of Japanese Application No. 2010-094689 filed on Apr. 16, 2010, the disclosures of which Applications are incorporated by reference herein.

TECHNICAL FIELD

The instant invention relates to an interchangeable lens type digital camera such as a single-lens reflex digital still camera.

BACKGROUND ART

A digital camera is configured to convert a captured image is converted into image data of a digital signal with an image capturing element such as, for example, an image sensor. The image data is recorded in a built-in memory or a recording medium such as a memory card. The digital camera may be an interchangeable lens type digital camera called a single-lens reflex digital camera which is configured to be used with various types of lenses according to the user's preference.

The digital camera may be used around a mobile terminal such as, for example, a mobile phone and Personal Handyphone System (PHS) both of radiate an electromagnetic wave. Similarly, the digital camera may be used around facilities, such as, for example, a radio station or a television station, which also radiate the strong electromagnetic wave.

When the digital camera is used such environments, there is a risk that electromagnetic wave interference affects the digital camera. The environment in which the digital camera is possibly affected by the electromagnetic wave interference is referred to as a "strong electric field environment". When the digital camera is used in the strong electric field environment, sometimes there is image interference in which a striped noise (beat noise) is generated in an image.

The image interference becomes more prominent with increasing sensitivity of the image capturing element of ISO 1600 or ISO 3200.

Therefore, the digital camera is covered with a conductive material, or a conductive filter is added to a surface of the lens to shield a strong electric field noise plunging into the image capturing element (for example, refer to PTL 1)

CITATION LIST

Patent Literature

PTL 1: Unexamined Japanese Patent Publication No. 2001-135969

SUMMARY OF THE INVENTION

In one general aspect, the instant application describes a digital camera including: a camera body that includes a body mount to which a lens unit, which forms an optical image of a subject, can be attached; an image capturing element that is disposed in a body chassis of the camera body to convert the optical image of the subject into image data; a main circuit board to which the image capturing element is electrically connected; and a viewfinder that includes a monitor on which a through image captured by the image capturing element is displayed, wherein a conductive shielding member is disposed in the body chassis in order to electromagnetically shield a region between a space in which the image capturing element and the main circuit board are disposed from a space in which the viewfinder is disposed.

With the above configuration, the exogenous electromagnetic wave that invades in the image sensor and the main circuit board of the camera body through the hot shoe provided in an upper portion of the camera body can effectively be shielded, and the image interference caused by the exogenous noise can be reduced.

DESCRIPTION OF EMBODIMENTS

Hereinafter, a digital camera and an interchangeable lens unit according to an exemplary embodiment of the instant invention will be described with reference to the drawings.

Figure 1:
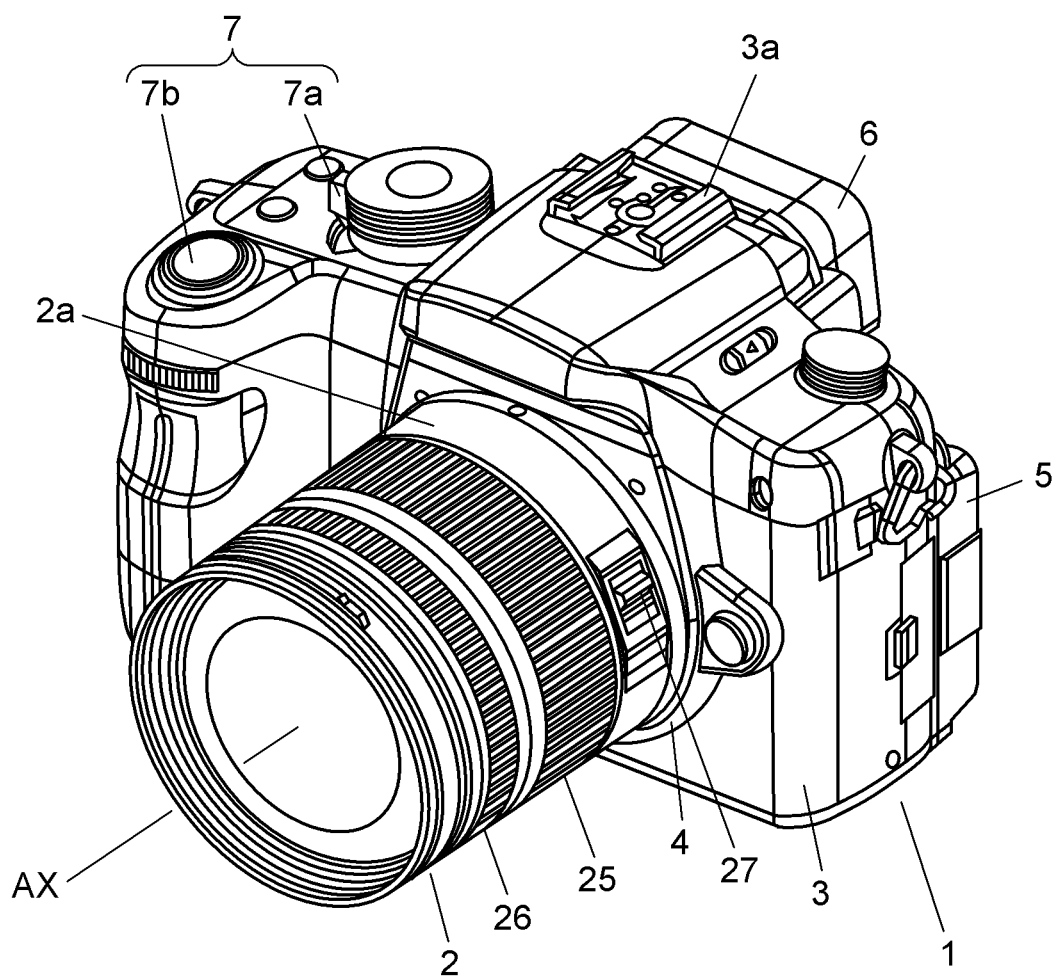
FIG. 1 is a perspective view illustrating an appearance of a digital camera according to an exemplary embodiment of the instant invention.
Figure 2:
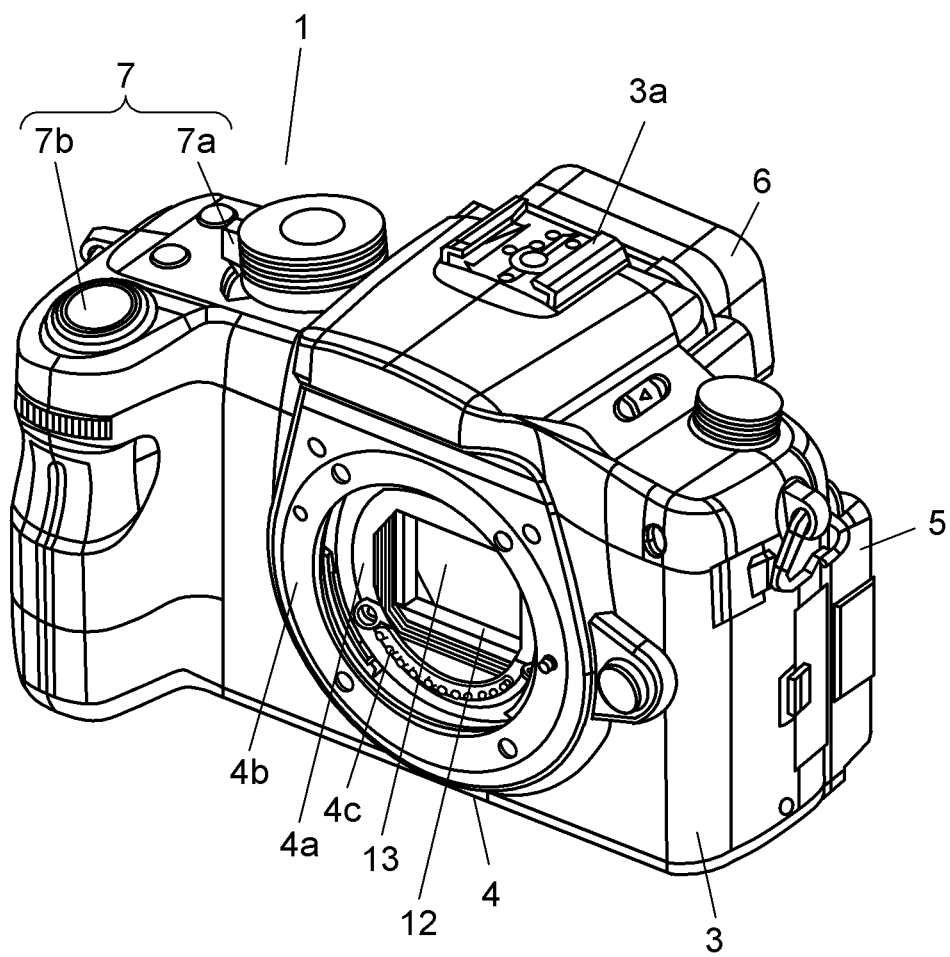
FIG. 2 is a perspective view illustrating a camera body from which an interchangeable lens unit is detached.
Figure 3:
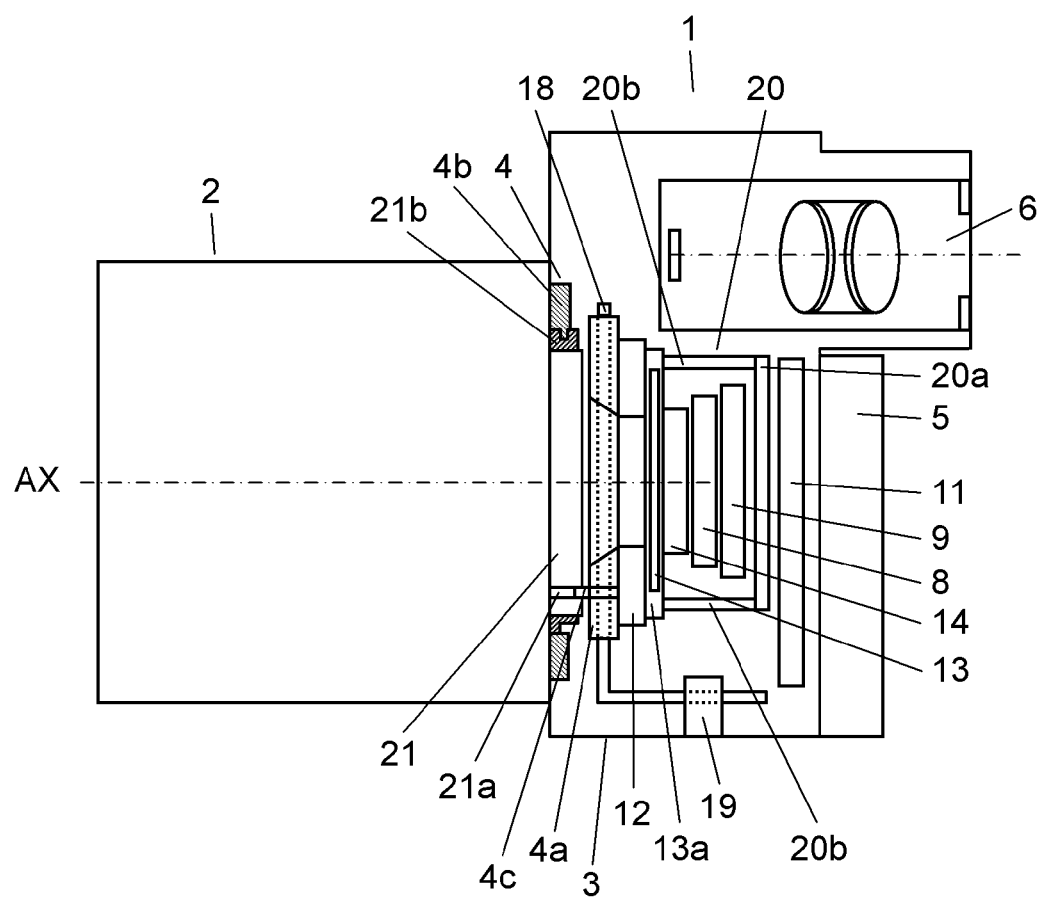
FIG. 3 is a schematic diagram of the digital camera.
Figure 4:
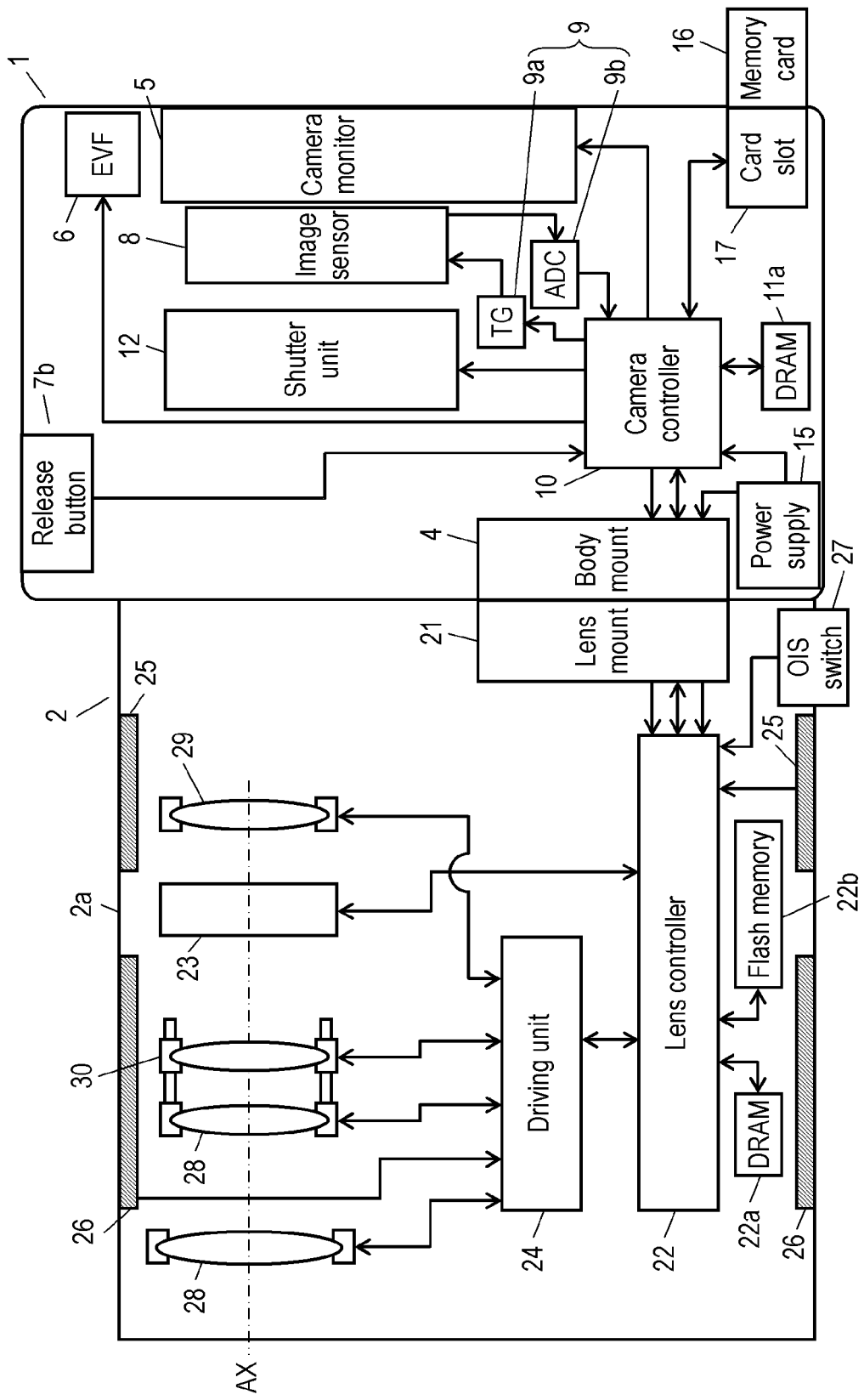
FIG. 4 is a functional block diagram of the digital camera.

FIG. 1 is a perspective view illustrating an appearance of the digital camera according to the exemplary embodiment of the instant invention, FIG. 2 is a perspective view illustrating a camera body from which the interchangeable lens unit is detached, FIG. 3 is a schematic diagram of the digital camera, and FIG. 4 is a functional block diagram of the digital camera.

As illustrated in FIGS. 1 to 4, the digital camera of the exemplary embodiment includes the camera body 1 and the interchangeable lens unit 2 that can be attached to the camera body 1.

The camera body 1 includes a body chassis 3, a body mount 4, a camera monitor 5, an electronic viewfinder (hereinafter referred to as EVF) 6, and a manipulation unit 7. The body mount 4 is disposed on a front surface side of the body chassis 3, and the interchangeable lens unit 2 can be attached to the body mount. The camera monitor 5 is disposed on a back surface side of the body chassis 3, and includes a liquid crystal display. The EVF 6 is disposed on the back surface side of the body chassis 3 to display an image of display image data. The manipulation unit 7 is disposed in an upper portion of the body chassis 3, and includes a power switch 7a and a release button 7b that receives a shutter manipulation performed by a user. A hot shoe 3a made of a metal is disposed at the top of the body chassis 3, and a strobe is attached to the hot shoe 3a.

The body chassis 3 accommodates a circuit board 9 on which CMOS (Complementary Metal Oxide Semiconductor) image sensor 8 is mounted, a main circuit board 11 that includes a camera controller 10, a shutter unit 12 that is disposed in front of the image sensor 8, a diaphragm 13, an optical low-pass filter 14, a power supply block 15 that includes a battery to supply electric power to units such as the body mount 4 and the camera controller 10, and a card slot 17 that inputs and outputs still image data and moving image data to attached a memory card 16 based on a control signal transmitted from the camera controller 10.

In FIG. 3, a main frame 18 made of a metal such as aluminum and stainless steel is disposed in body the chassis 3. The main frame 18 is connected to a terminal support 4a of the body mount 4 and supports the interchangeable lens unit 2 with the body mount 4 interposed therebetween. A tripod mount 19 having a tripod taphole in which a tripod is attached is mechanically connected to the main frame 18, and the tripod taphole is exposed to a lower surface of the body chassis 3. A metallic radiator member 20, which is disposed so as to surround the circuit board 9 on which the image sensor 8 is mounted, promotes radiation of heat generated by the image sensor 8, and the radiator member 20 includes a radiator plate 20a that is disposed between the circuit board 9 and the main circuit board 11 and a thermal conductor 20b that transfers the heat of the radiator plate 20a onto the side of the body mount 4.

The body mount 4, the shutter unit 12, the diaphragm 13, the optical low-pass filter 14, the image sensor 8, the circuit board 9, the radiator member 20, the main circuit board 11, and the camera monitor 5 are sequentially disposed from the front in the camera body 1.

A main part of the camera body 1 will be described below in detail.

As illustrated in FIGS. 2 and 3, the body mount 4 is a component that is used to attach the interchangeable lens unit 2 to the camera body 1, and the body mount 4 is mechanically and electrically connected to the lens mount 21 of the interchangeable lens unit 2. The body mount 4 includes a metallic body mount ring 4b that is attached to the front surface of the body chassis 3, and connection a terminal 4c that is provided in the terminal support 4a. The interchangeable lens unit 2 is attached to the camera body 1, whereby connection a terminal 21a provided in a lens mount 21 is electrically connected to connection the terminal 4c.

The body mount ring 4b of body the mount 4 is fitted in a metallic lens mount ring 21b of the lens mount 21 provided in interchangeable lens unit 2, whereby the interchangeable lens unit 2 is mechanically retained in the camera body 1. A lens mount ring 21b is fitted in the body mount ring 4b by what is called a bayonet mechanism. Specifically, the lens mount ring 21b takes a first state in which the lens mount ring 21b is not fitted in the body mount ring 4b and a second state in which the lens mount ring 21b is fitted in body the mount ring 4b according to a rotational position relationship with body the mount ring 4b about an optical axis. In the first state, the lens mount ring 21b can be moved in an optical axis direction relative to body the mount ring 4b, and be inserted in body the mount ring 4b. When the lens mount ring 21b is rotated relative to the body mount ring 4b while inserted in the body mount ring 4b, the lens mount ring 21b is fitted in the body mount ring 4b. At this point, the rotational position relationship between the body mount ring 4b and the lens mount ring 21b is the second state.

Connection the terminal 4c is electrically connected to the connection terminal 21a of the lens mount 21 while the interchangeable lens unit 2 is attached to the camera body 1. Thus, the body mount 4 and the lens mount 21 can electrically be connected while the connection terminal 4c of the body mount 4 and the connection terminal 21a of the lens mount 21 are interposed therebetween. Accordingly, in the digital camera, at least one of data and a control signal can be transmitted and received between camera body 1 and the interchangeable lens unit 2 through the body mount 4 and the lens mount 21. Specifically, the body mount 4 and the lens mount 21 can transmit and receive at least one of the data and the control signal between the camera controller 10 and the lens controller 22 included in the interchangeable lens unit 2. The body mount 4 supplies the electric power received from the power supply block 15 to the whole of the interchangeable lens unit 2 through the lens mount 21.

The image sensor 8 converts a subject image, which is an optical image of a subject and incident through the interchangeable lens unit 2, into the image data. The image sensor 8 is operated based on a timing signal from a timing signal generator (TG) 9a mounted on the circuit board 9. An AD converter (ADC) 9b mounted on the circuit board 9 converts the generated image data such as the still image data and the moving image data into a digital signal, and the camera controller 10 performs various pieces of image processing to the digital signal. At this point, examples of the various pieces of image processing include gamma correction processing, white balance correction processing, flaw correction processing, YC conversion processing, electronic zoom processing, and JPEG compression processing. A function of the circuit board 9 may be mounted on the main circuit board 11.

The moving image data captured by the image sensor 8 is also used in displaying a through image. As used herein, the through image means an image in which data in the moving image data is not recorded in the memory card 16, and the through image is displayed on the camera monitor 5 and/or the EVF 6 in order to decide a composition of the moving image or the still image.

The camera controller 10 is mounted on the main circuit board 11. The camera controller 10 controls each unit of the camera body 1, and transmits a signal controlling the interchangeable lens unit 2 to a lens controller 22 through the body mount 4 and the lens mount 21 to indirectly controls each unit of the interchangeable lens unit 2. The camera controller 10 receives various signals from the lens controller 22 through the body mount 4 and the lens mount 21. The camera controller 10 uses a DRAM 11a, which is mounted on the main circuit board 11, as a work memory during the control operation and the image processing operation.

The shutter unit 12 is what is called a focal plane shutter, and the shutter unit 12 is disposed between the body mount 4 and the image sensor 8 to be able to shield light incident on the image sensor 8. The shutter unit 12 includes a rear curtain, a front curtain, and a shutter support frame having an opening through which the light guided from the subject to the image sensor 8 passes. In the shutter unit 12, the rear curtain and the front curtain are progressed to and retreated from the opening of the shutter support frame, thereby adjusting an exposure time of the image sensor 8.

The diaphragm 13 is supported by a diaphragm support 13a while disposed on the front side of the image sensor 8, and the diaphragm 13 prevents dust from adhering to the image sensor 8. The diaphragm support 13a supports the diaphragm 13 such that the diaphragm 13 is disposed in a predetermined position relative to the image sensor 8, and the diaphragm support 13a is supported by the main frame 18 while the body mount 4 and the shutter unit 12 are interposed therebetween.

The optical low-pass filter 14 removes a radio frequency component of subject light such that resolution of the subject image formed by the interchangeable lens unit 2 becomes coarser than a pixel pitch of the image sensor 8. Generally, in the image capturing element such as the image sensor 8, an RGB color filter or a YCM complementary color filter, which is called a Bayer array, is disposed in each pixel. When the resolution is performed into one pixel, not only a false color is generated, but also an unsightly moire phenomenon is generated in the subject having a repetitive pattern. Therefore, the optical low-pass filter 14 is disposed. The optical low-pass filter 14 also has an IR cut filter function of cutting an infrared ray.

The interchangeable lens unit 2 will be described below. A main function of the interchangeable lens unit 2 will be described with reference to FIGS. 1 and 4.

The interchangeable lens unit 2 includes an optical system, the lens mount 21, the lens controller 22, a aperture unit 23, and a driving unit 24. The optical system includes a lens group that is arrayed on an optical axis AX in a resin lens barrel 2a in order to form an optical image of the subject. The driving unit 24 drives the lens group of the optical system. A zoom ring 25, a focus ring 26, and an OIS switch 27 are provided in an outer circumferential portion of the lens barrel 2a. A position of the lens in the lens barrel 2a is adjusted by rotating the zoom ring 25 and the focus ring 26.

The optical system includes a zoom lens group 28 that changes a focal distance of the optical system, an OIS (Optical Image Stabilizer) lens group 29 that suppresses a blur of the subject image formed by the optical system to the image sensor 8, and a focus lens group 30 that changes a focus state of the subject image, which is formed on the image sensor 8 by the optical system. The aperture unit 23 is a light quantity adjusting member that adjusts a quantity of the light transmitted through the optical system. Specifically, the aperture unit 23 includes aperture blades that can shield some beams of the light transmitted through the optical system and an aperture driving unit that drives the aperture blades. The driving unit 24 drives each lens group of the optical system based on the control signal of the lens controller 22, and includes a detection unit that detects a position of each lens group of the optical system.

The lens controller 22 controls the whole of the interchangeable lens unit 2 based on the control signal transmitted from the camera controller 10. The lens controller 22 receives positional information on each lens group of the optical system, which is detected by the detection unit of the driving unit 24, and the lens controller 22 transmits the positional information to camera the controller 10. The camera controller 10 generates the control signal controlling the driving unit 24 based on the received positional information, and transmits the control signal to the lens controller 22. The lens controller 22 transmits the control signal generated by camera the controller 10 to the driving unit 24, and the driving unit 24 adjusts the positions of the lens groups 28, 29, and 30 based on the control signal. On the other hand, the camera controller 10 generates the control signal operating the aperture unit 23 based on pieces of information such as the light quantity received by the image sensor 8, whether still image shooting or moving image shooting is performed, and whether a manipulation to preferentially set an aperture value is performed. At this point, the lens controller 22 relays the control signal generated by the camera controller 10 to the aperture unit 23.

When the lens groups 28, 29, and 30 of the optical system and the aperture unit 23 are the driven, lens controller 22 uses the DRAM 22a as the work memory, and a program and a parameter, which are used by the lens controller 22, are stored in a flash memory 22b.

A shielding structure of the camera body 1 will be described below with reference to FIGS. 5 to 7.

Figure 5:
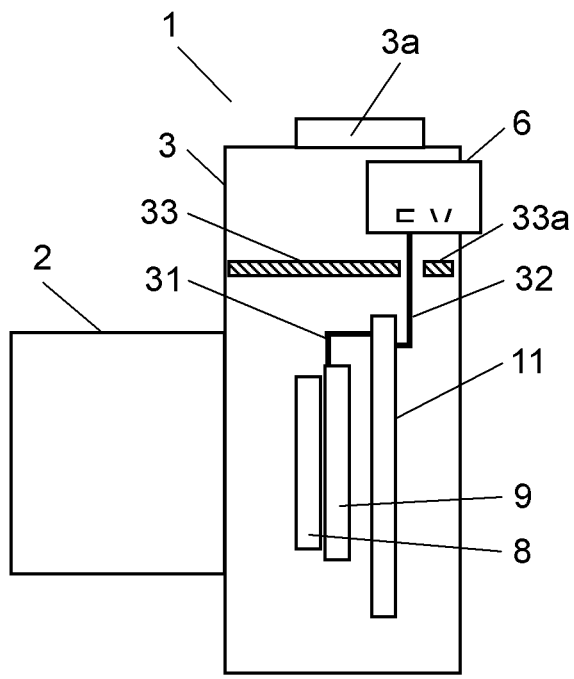
FIG. 5 is a schematic diagram illustrating an exemplary embodiment of a shielding structure in the digital camera according to the exemplary embodiment of the instant invention.
Figure 6:
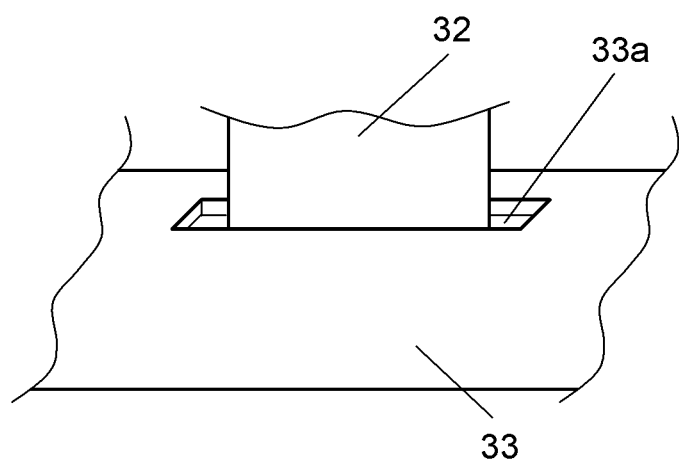
FIG. 6 is a perspective view illustrating an enlarged main part of a conductive shielding member of FIG. 5.

In the digital camera, as illustrated in FIG. 5, an electric signal of the image data into which the optical image of the subject is converted by the image sensor 8 is transmitted to the main circuit board 11 on which the camera controller 10 is mounted through a flexible wiring board 31 that is of the wiring member. The electric signal corresponding to the transmitted image data is converted into a displayable video signal by the EVF 6, and the video signal is transmitted to the EVF 6 through the flexible wiring board 32 that is of the wiring member. The EVF 6 includes a liquid crystal display or an organic EL display that serves as the display unit (not illustrated) and a driving LSI (not illustrated). A user can confirm the subject image by seeing the image displayed on the display unit of the EVF 6. As well as the EVF 6, the video signal is also transmitted to camera monitor 5.

In the exemplary embodiment, as illustrated in FIG. 5, in body chassis 3, a plate-like conductive shielding member 33 is disposed between a space in which the image sensor 8 and the main circuit board 11 are disposed from a space in which the EVF 6 is disposed in order to perform electromagnetic shielding. As illustrated in FIG. 6, the conductive shielding member 33 has a hole 33a through which the flexible wiring board 32, which is the wiring member electrically connecting the main circuit board 11 and the EVF 6, passes. Although not illustrated, the conductive shielding member 33 is electrically connected to a conductive member such as the main frame 18 in the body chassis 3.

In the body chassis 3, the conductive shielding member 33 is disposed between the space in which the image sensor 8 and the main circuit board 11 are disposed from the space in which the EVF 6 is disposed in order to perform electromagnetic shielding, so that the exogenous electromagnetic wave, which invades in the image sensor 8 and the main circuit board 11 of the camera body 1 through the upper portion of camera body 1, particularly the hot shoe 3a, can effectively be shielded.

The digital camera of the exemplary embodiment in which the shielding structure of FIG. 5 is adopted and a digital camera in which the conductive shielding member 33 is not disposed are uniformly irradiated with an electromagnetic field of 3 V/m at 216 MHz from the outside to simulate a voltage induced in the position of the image sensor 8 by an FDTD method, thereby checking an influence of the electromagnetic field from the outside. In the digital camera of the exemplary embodiment in which the shielding structure is adopted, it is found that a peak value of the induced voltage can be reduced by about 20% compared with the digital camera in which the conductive shielding member 33 is not disposed.

The result shows that the voltage induced in the image sensor 8 by the external electromagnetic field can be reduced even if the digital camera is used in the strong electric field environment. Therefore, the image interference with the captured image can be reduced.

Figure 7:
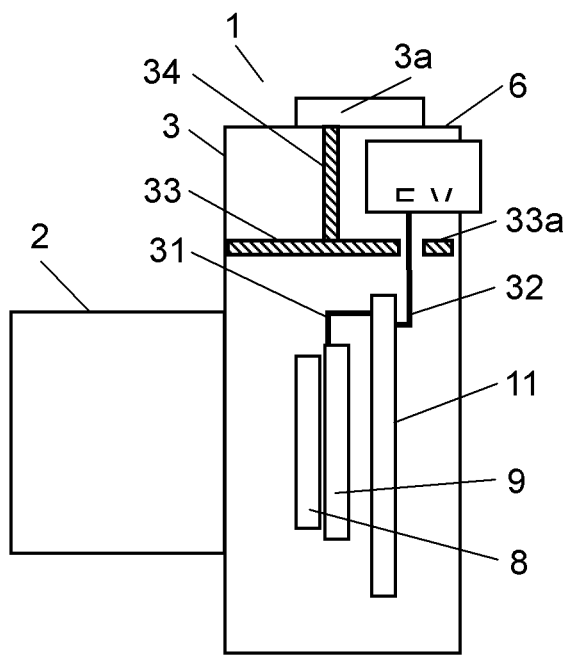
FIG. 7 is a schematic diagram illustrating another exemplary embodiment of the shielding structure in the digital camera according to the exemplary embodiment of the instant invention.

FIG. 7 is a schematic diagram illustrating another exemplary embodiment of shielding structure in the digital camera according to the exemplary embodiment of the instant invention. In the exemplary embodiment of FIG. 7, another conductive shielding member 34 is provided to electrically connect the conductive shielding member 33 and the hot shoe 3a.

The strobe and the like are externally attached to the hot shoe 3a. When the strobe is externally attached, the hot shoe 3a is easily influenced by the external electromagnetic field, a potential at hot shoe 3a becomes unstable to be easily affected by the image interference. In the exemplary embodiment, as illustrated in FIG. 7, hot shoe 3a is electrically connected to the conductive shielding member 33 through conductive shielding member 34, whereby the potential at the hot shoe 3a can stably be maintained and prevented from being easily affected by the image interference.

Other implementations are contemplated. For example, a surface of the flexible wiring board 32 that electrically connects the main circuit board 11 and the EVF 6 may be covered with a conductive film. The conductive film allows the shielding effect to be further enhanced.

Other implementations are contemplated.

INDUSTRIAL APPLICABILITY

As described above, according to the instant invention, the image interference caused by the exogenous noise is effectively reduced in the interchangeable lens type digital camera.

REFERENCE MARKS IN THE DRAWINGS

1 Camera body
2 Interchangeable lens unit
3 Body chassis
4 Body mount
5 Camera monitor
6 Electronic viewfinder
7 Manipulation unit
8 Image sensor
9 Circuit board
10 Camera controller
11 Main circuit board
12 Shutter unit
15 Power supply block
4a Terminal support
4b Body mount ring
4c Connection terminal
2a Lens barrel
21 Lens mount
21a Connection terminal
21b Lens mount ring
22 Lens controller
23 Aperture unit
24 Driving unit
28,29,30 Lens group
31,32 Flexible wiring board
33,34 Conductive shielding member

The invention claimed is:

1. A digital camera comprising:
a camera body that includes a body mount to which a lens unit, which forms an optical image of a subject, can be attached;
an image capturing element that is disposed in a body chassis of the camera body to convert the optical image of the subject into image data;
a main circuit board to which the image capturing element is electrically connected;
a viewfinder that includes a monitor on which a through image captured by the image capturing element is displayed; and
a wiring member that electrically connects the main circuit board and the viewfinder,
wherein a conductive shielding member is disposed in the body chassis in order to electromagnetically shield a space in which the image capturing element and the main circuit board are disposed from a space in which the viewfinder is disposed,
the conductive shielding member includes a hole through which the wiring member passes, and
said conductive shielding member wholly separating the space in which the image capturing element and the main circuit board are disposed from the space in which the viewfinder is disposed, expect for the hole through which the wiring member passes.

2. A digital camera comprising:
a camera body that includes a body mount to which a lens unit, which forms an optical image of a subject, can be attached;
an image capturing element that is disposed in a body chassis of the camera body to convert the optical image of the subject into image data;
a main circuit board to which the image capturing element is electrically connected;
a viewfinder that includes a monitor on which a through image captured by the image capturing element is displayed; and
a hot shoe,
wherein a conductive shielding member is disposed in the body chassis in order to electromagnetically shield a space in which the image capturing element and the main circuit board are disposed from a space in which the viewfinder is disposed, and said conductive shielding member wholly separating the space in which the image capturing element and the main circuit board are disposed from the space in which the viewfinder is disposed, expect for a hole through which a wiring member passes, and
another conductive shielding member is provided in the body chassis to electrically connect the hot shoe to the conductive shielding member.

3. The digital camera according to a claim 1, wherein the conductive shielding member is electrically connected to a conductive member in the body chassis.

4. The digital camera according to a claim 2, wherein the conductive shielding member is electrically connected to a conductive member in the body chassis.

* * * * *